United States Patent [19]

Lin

[11] Patent Number: 4,969,541

[45] Date of Patent: Nov. 13, 1990

[54] A VEHICLE BUMP-AVOIDING BRAKE MACHINE CAPABLE OF DIRECTLY PUSHING A BRAKE PEDAL AND A STRUCTURE AFFIXED THERETO FOR THE BRAKE MACHINE TO PUSH THE BRAKE PEDAL

[76] Inventor: Yng-Lang Lin, No. 126, 4th Fl., Chiaochung 1 st.,, Panchiao City, Taipei, Taiwan

[21] Appl. No.: 227,010

[22] Filed: Jul. 26, 1988

Related U.S. Application Data

[63] Continuation-in-part of Ser. No. 66,054, Jun. 24, 1987, abandoned.

[51] Int. Cl.$^5$ .................. F16D 65/28; B60T 13/74
[52] U.S. Cl. ................................. 188/156; 188/162; 180/272
[58] Field of Search ............... 188/156, 153, 157, 162; 180/315, 316; 74/481, 491, 498; 254/D5

[56] References Cited

U.S. PATENT DOCUMENTS

| 1,300,094 | 4/1919 | Adler, Jr. | 188/156 |
| 1,655,227 | 3/1928 | Smith | 188/156 |
| 2,385,982 | 10/1945 | Gary | 180/272 |
| 3,662,593 | 5/1972 | Pirello et al. | 254/D5 |
| 3,812,750 | 5/1974 | Meyer | 188/162 X |

Primary Examiner—Robert P. Olszewski
Assistant Examiner—Matthew C. Graham

[57] ABSTRACT

The present invention relates to a vehicle bump-avoiding brake machine and a structure affixed to a brake pedal for the brake machine to push the brake pedal, wherein a motor drives gears, which then drive a rack. it can be easily mounted in various vehicles in such a manner that the rack directly pushes a brake pedal. The brake pedal is equipped with a laterally extending, or a laterally extending and downward extending portion, and when the extending portion is pushed by the rack, the vehicle will brake. When an induction apparatus installed in front of or behind the vehicle or a switch installed on the steering wheel supplies electric current for the brake machine of the present invention, the rack will move forward and brake the vehicle.

1 Claim, 1 Drawing Sheet

A VEHICLE BUMP-AVOIDING BRAKE MACHINE CAPABLE OF DIRECTLY PUSHING A BRAKE PEDAL AND A STRUCTURE AFFIXED THERETO FOR THE BRAKE MACHINE TO PUSH THE BRAKE PEDAL

CROSS-REFERENCES TO RELATED APPLICATIONS

The present invention is originally a continuation-in-part of the application Ser. No. 07/066,054, now abandoned, filed 6/24/87, and is now filed as an individual case. Please regard the filing date of application Ser. No. 07/066,054 as that of the present invention.

BACKGROUND OF THE INVENTION

In the past, many people tried to invent a safety control system with automatic induction and automatic braking functions or to invent other car safety control system. However, it was the brake control technique in which they failed to carry out their ideas because that cars already available on the market are not designed to be additionally installed with the brake control device. Moreover, various cars are fashioned with different shapes. Thus, it is very difficult and can hardly be practiced to invent a small brake machine which is suitable to be mounted on various cars easily. For example, the brake design in G. M. Gary's automobile controls of U.S. Pat. No. 2,385,928 is so big and complex that it can't be installed in the car available on the market. Even newly designed cars won't use such a big complicated brake design as the automobile control. Therefore, it remains unpractical at present. Yet, this invention, a product of several years' research, can solve the above problems and achieve object of controlling braking and avoiding bump.

SUMMARY OF THE INVENTION

The present invention is characterized by a small machine wherein a rack is extended to directly push a brake pedal. The small machine is easy to be mounted on various car; the car will brake automatically when the rack pushes a laterally extending or a laterally extending and downward extending portion attached to the brake pedal.

DESCRIPTION OF THE PREFERRED EMBODIMENTS

Figure 1:
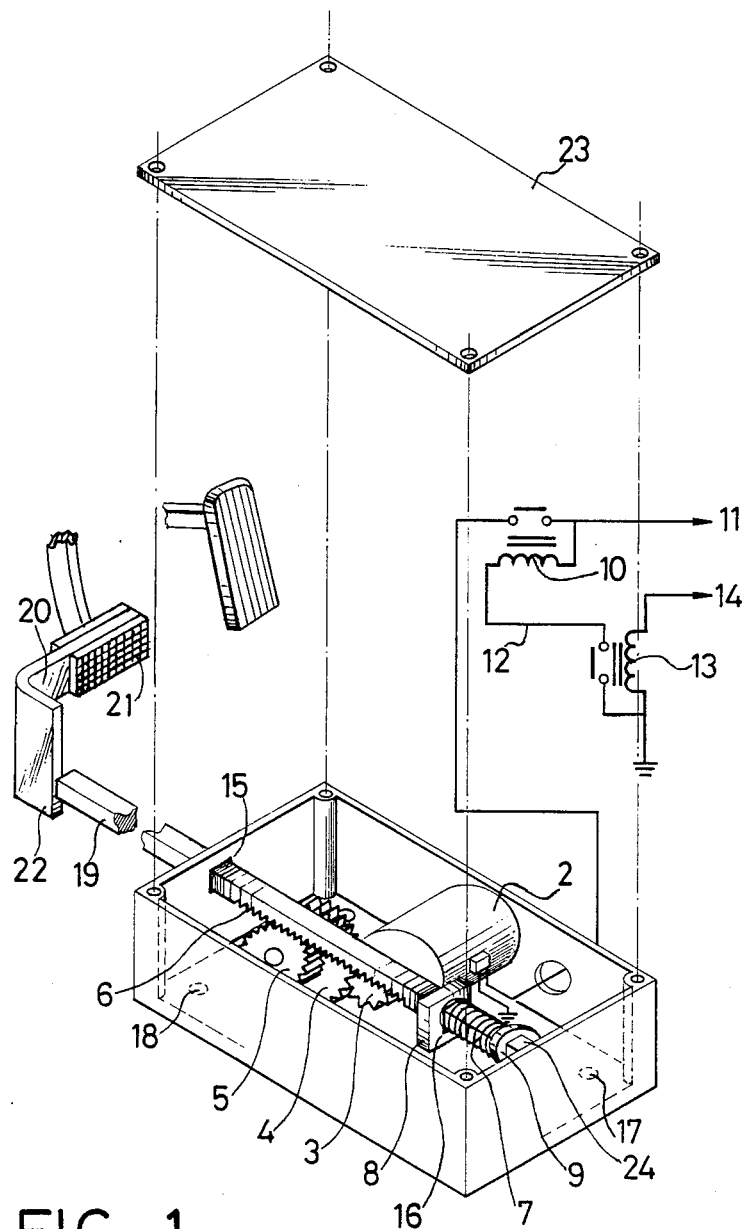
FIG. 1 is a perspective view of the present invention.

The brake machine of the present invention includes a housing, a motor, a reducing gear, a device for moving a rack, a device for auto-returning the rack, a starting device, and so on. The housing 1 is in a flat case fashion. The motor 2 is in a direct current and high speed motor fashion. The reducing gear 3 is in a pinion fashion, driven by the motor 2 and meshing with a first gear 4. The device for moving a rack includes a second gear 5 coaxially associated with the first gear 4 and meshing with a rack 6. The second gear 5 can drive the rack 6 forward. The device for auto-returning the rack includes a compression spring 7 fitted to an end of the rack 6 with its one end abutting against a rack support 8 on which the rack 6 is mounted and its other end abutting against a washer member 9 fitted to the end of the rack 6.

The starting device includes an electromagnetic switch 10 pushing a contact point by means of an electromagnet to electrically connect with an anode of a power source for supplying electric current for the motor 2. The electric current required by the electromagnetic switch 10 is conducted through a relay 13. The rack 6 is mounted through a hole 16 of the rack support 8 and a hole 15 of the housing 1.

There are holes 17, 18 formed on a bottom of the housing for extending screws therethrough to mount the brake machine. The brake machine is located within a space right under the driver's seat or in front of that space (for example, behind the heels of the driver) and will not be touched by the driver's feet during driving.

The rack 6 includes a long extending portion 19 without tooth. An end of the extending portion contacts with a laterally extending portion 20 extending from a brake pedal 21 or contacts with a laterally and downward extending portion 22 extending from the brake pedal 21 for pushing the brake pedal 21. Since the laterally extending portion or the laterally and downward extending portion is provided, therefore the driver will not tread on the long extending portion 19 of the rack 6 when stepping on the brake pedal 21.

The laterally extending portion 20 is extended with a suitable width so that it will not interfere with the driver's movement of stepping on the clutch pedal. (Nowadays, cars are gradually changed to be without clutch pedal.) If a steel incline exists in front of the brake pedal in a car, the extending portion can be arch-shaped or inclined corresponding thereto, so as not to touch the incline. The long extending portion 19 of the rack 6 can be sleeved by a pipe one end of which is fixed to the housing. The brake machine is covered with a lid 23.

When the motor 2 is started, the rack 6 is driven to push the brake pedal. The rack 6 is thereafter stopped and rebounded toward its home position via recovering force of the compression spring 7. The rebounded rack 6 is then stopped by the housing 1 with a rubber gasket 24 fitted to its end abutting against the housing 1.

After first carefully studying the common, never changed features of various cars, the inventor found that a common feature thereof is that every car has a considerably wide space under and in front of the seat of the driver. The brake machine of the present invention is designed according to the common feature so that it can be easily installed in any car so as to directly push the brake pedal. The brake pedal also is easy to be provided with the laterally extending and downward extending portion because that the brake pedal of any car has a plane portion and the laterally extending portion is a plate. The driver won't step on the long extending portion of the rack 6 because the driver always gets on or off the car in a striding manner so that the driver will naturally stride over the long extending portion. Moreover, since the brake pedal is provided with the downward extending portion, the long extending portion is much lower than the brake pedal.

The inventor has practically applied the present invention to a car. When an induction apparatus placed in front of or behind the car, or a switch located on the steering wheel operate to supply the relay with electric current, the car will automatically brake with quite satisfactory and practical effect. The invention thoroughly overcomes the aforesaid difficulties existing in prior brake control technique.

Having now fully explained the invention as to its purpose, its construction and its use, it will be evident that the same is susceptible to numerous variations without departing from the spirit thereof, and accordingly, attention is now directed to the appended claims to ascertain the actual scope of the same.

I claim:

1. A compact device for applying a pushing force to a vehicle brake pedal, comprising: a flat, compact housing mounted heneath a driver's vehicle seat, said housing enclosing a motor, a pinion driven by said motor, a first gear meshing with said pinion, a second gear coaxially mounted with and rotatably fixed with said first gear, and a rod having a rack portion which meshes with said second gear, said rod extending through an aperture in said housing and said rod having an end which is engageable with a relatively flat, laterally extending portion which is mounted to said vehicle brake pedal, whereby a control device is actuable to rotate said motor to drive the gears and the rack portion to push the rod into the laterally extending portion and thereby actuate the brake pedal.

* * * * *